UNITED STATES PATENT OFFICE 2,590,957

ORGANOSILOXANE RESINS CONTAINING AS SUBSTITUENTS (CH$_3$)$_3$SiCH$_2$— OR (CH$_3$)$_2$C$_6$H$_5$SiCH$_2$—

John T. Goodwin, Jr., Midland, Mich., assignor to Dow Corning Corporation, Midland, Mich., a corporation of Michigan No Drawing. Application May 1, 1950, Serial No. 159,393

3 Claims. (Cl. 260—46.5)

The present invention relates to new organosilicon resins and to their method of production.

The present invention is a continuation in part of my copending application, Serial No. 82,475, filed March 19, 1949 now U. S. Patent No. 2,507,518.

The present organosilicon industry is based upon siloxanes which are materials in which the silicon atoms are linked through oxygen atoms. Another type of compound is one in which the silicon atoms are linked directly to each other. Still a third type is one in which the silicon atoms are linked by organic radicals. The literature presents very little information about this last type of compound.

Objects of the present invention are to produce organosiloxane resins in which some of the silicon atoms are bonded to triorganosilylmethyl radicals. Other objects and advantages of the present invention will be apparent from the following description and the subjoined claims.

In accord with the present invention a compound of the formula RSiCl$_3$ and a composition of the average formula R′$_n$SiCl$_{4-n}$ are co-hydrolyzed by reacting water with a mixture thereof and the reaction product thereof cocondensed. In the above formula, R is a substituent selected from the group consisting of (CH$_3$)$_3$SiCH$_2$— and (CH$_3$)$_2$C$_6$H$_5$SiCH$_2$—, R′ is selected from the group consisting of alkyl and monocyclicaryl radicals and $n$ has an average value of from 1 to 2 inclusive. There is thereby produced an organosilicon resin containing units of the formula RSiO$_{1.5}$ and $$R'_n SiO_{\frac{4-n}{2}}$$

In this resin, the ratio of R+R′ to Si is from 1 to 1.6 inclusive, and the said units are connected by silicon-oxygen-silicon bonding.

The compound of the formula (CH$_3$)$_3$SiCH$_2$SiCl$_3$ may be produced by reacting SiCl$_4$ with (CH$_3$)$_3$SiCH$_2$MgCl or (CH$_3$)$_3$SiCH$_2$Li.

The organolithium compound, (CH$_3$)$_3$SiCH$_2$Li, may be prepared by gradually adding (CH$_3$)$_3$SiCH$_2$Cl to an equivalent weight of a finely divided suspension of lithium in mineral oil.

The Grignard reagent, (CH$_3$)$_3$SiCH$_2$MgCl, may be prepared by reacting magnesium with an equivalent weight of chloromethyltrimethylsilane in ether solution.

Similarly, the reactant, (CH$_3$)$_2$C$_6$H$_5$SiCH$_2$SiCl$_3$, may be prepared by substituting (CH$_3$)$_2$C$_6$H$_5$SiCH$_2$Cl for the (CH$_3$)$_3$SiCH$_2$Cl reactant.

To assure a high yield of the desired product, (CH$_3$)$_3$SiCH$_2$SiCl$_3$ or (CH$_3$)$_2$C$_6$H$_5$SiCH$_2$SiCl$_3$, the organometallic compound is employed in proportion of 0.5 to less than 3 molar equivalents per mol of silicon tetrachloride. Preferably equimolecular amounts are employed. The reaction may be carried out by mixing the organometallic compound with the silicon tetrachloride. The resulting product may be purified by filtering and distilling as desired.

The hydrolysis of the organosilicon compositions to produce copolymer resins may be carried out by cohydrolyzing by reacting water with a mixture of RSiCl$_3$ and R′$_n$SiCl$_{4-n}$ and cocondensing the reaction product thereof. In such a process, the reaction may be carried out in the presence of a solvent such as toluene. The hydrolyzing and cocondensing may be carried out at a temperature of between 0° C. and 250° C.

The resins of the present invention are of utility in formulating heat and weather resistant coatings for boilers, stacks, ovens and other hot metal surfaces.

Example 1

When 245 parts by weight of (CH$_3$)$_3$SiCH$_2$Cl is added to 48 parts of magnesium in ethyl ether, (CH$_3$)$_3$SiCH$_2$MgCl is obtained. The Grignard reagent so prepared is added to 680 parts of silicon tetrachloride. The reactants couple readily at room temperature. The product is filtered, and the filtrate transferred to a stripping still and the ether stripped off. Distillation yields 255 parts of the compound (CH$_3$)$_3$SiCH$_2$SiCl$_3$. The compound has a boiling point of 165.8° C. at atmospheric pressure, a density of 1.1234 at 25° C., a refractive index of 1.4448 at 25° C., and a specific refraction of 0.2368.

When a mixture of 149.5 parts of CH$_3$SiCl$_3$, 221.5 parts of (CH$_3$)$_3$SiCH$_2$SiCl$_3$ and 191 parts of C$_6$H$_5$CH$_3$SiCl$_2$ is gradually added during one-half hour to 635 parts of toluene in 1168 parts of H$_2$O, hydrolysis occurs with the separation of an organic layer. This organic layer is decanted and shaken with NaHCO$_3$. It is then washed, filtered, and concentrated to 35 per cent solids. The resulting composition will be upon drying a tough, flexible resin.

Example 2

When silicon tetrachloride in amount of 170 parts by weight is gradually added over a period of one hour to 84 parts of the organolithium compound, $(CH_3)_3SiCH_2Li$, dissolved in pentane coupling occurs with the production of $(CH_3)_3SiCH_2SiCl_3$ When 775.3 parts of this product is mixed with 971.8 parts of $CH_3SiCl_3$, added to 1710 parts of toluene, and the resulting solution added to 338 parts of $H_2O$ in 270 parts of isopropyl alcohol, hydrolysis occurs with phase separation. The reaction mixture is decanted. The water insoluble layer is refluxed for 2 hours and then washed. It is then concentrated to 35 per cent solids. The resulting composition upon coating on a panel and drying will be a tough, flexible resin.

Example 3

When 239.9 parts of $C_6H_5(CH_3)_2SiCH_2Cl$ are added to 32 parts by weight of magnesium and 300 parts of ethyl ether, reaction occurs. 700 parts of ethyl ether are then added and the mixture stirred. The resulting Grignard reagent is $C_6H_5(CH_3)_2SiCH_2MgCl$.

1000 parts of toluene and 500 parts of $SiCl_4$ are mixed and the Grignard reagent $C_6H_5(CH_3)_2SiCH_2MgCl$ added. The reaction mixture is stirred for 10 hours. The reaction mass is filtered and stripped of toluene. The residue is distilled, and 177 parts of the product $C_6H_5(CH_3)_2SiCH_2SiCl_3$ are obtained. This compound has a boiling point of 146° C. at 20 mm., a refractive index of 1.5174 at 25° C., a density of 1.187 at 25° C. and a specific refraction of 0.3028.

When 47 parts of this product, $(CH_3)_2C_6H_5SiCH_2SiCl_3$ 35 parts of $C_6H_5SiCl_3$ and 100 parts of $CH_3SiCl_3$ are mixed and added to 232 parts of toluene, and the resulting solution added to 32 parts of water in 27.2 parts of isopropyl alcohol, hydrolysis occurs with phase separation. The reaction mixture is decanted. The water insoluble layer is refluxed for two hours and then washed, following which the resin is concentrated to 30 per cent solids. The resulting composition upon drying will be a tough, flexible resin.

That which is claimed is:

1. An organosilicon copolymer resin containing units of the formula $RSiO_{1.5}$ and $$R'_n SiO_{\frac{4-n}{2}}$$

where R is a substituent selected from the group consisting of $(CH_3)_3SiCH_2-$ and $(CH_3)_2C_6H_5SiCH_2-$ R' is a radical selected from the group consisting of alkyl and monocyclicaryl radicals, and $n$ has an average value of from 1 to 2 inclusive, the remaining valences of the silicon atoms of said units being satisfied by oxygen atoms, in which the ratio of R+R' to Si is from 1 to 1.6 inclusive, and in which, the said units are connected by silicon-oxygen-silicon bonding.

2. A copolymer resin in accord with claim 1 in which R is $(CH_3)_3SiCH_2-$.

3. A copolymer resin in accord with claim 1 in which R is $(CH_3)_2C_6H_5SiCH_2-$.

JOHN T. GOODWIN, Jr.

REFERENCES CITED

The following references are of record in the file of this patent:

UNITED STATES PATENTS

| Number | Name | Date |
|---|---|---|
| 2,486,162 | Hyde | Oct. 25, 1949 |
| 2,507,518 | Goodwin | May 16, 1950 |